United States Patent Office 2,802,732
Patented Aug. 13, 1957

2,802,732

SLAG PRODUCING MATERIAL AND METALLURGICAL METHOD EMPLOYING SAME TO RECOVER METAL VALUES FROM STEEL

Frederick J. Crolius, Pittsburgh, Pa.

No Drawing. Application December 4, 1953,
Serial No. 396,308

5 Claims. (Cl. 75—44)

This invention relates to metallurgy of chromium-bearing steels, and is for a slag forming material and a method by which the slag forming material may utilize metal values which presently are not economically recoverable.

Slag is usually added to a furnace charge in the form of native raw material such as limestone or silica, often with iron oxide, in a predetermined relation to the weight of the furnace charge and with proper relation to the furnace lining.

In accordance with the present invention I provide a heavy metalized slag material in the nature of a hydraulic cement, in some cases containing lime, combined with metal wastes, such as stainless steel grindings, whereby a relatively high melting protecting vehicle or carrier is provided for the metal particles to protect the particles against oxidation while they are being heated to a point approaching the melting point, the cement or cement and lime themselves when melted to release the metal becoming a valuable slag addition to maintain the proper slag to metal ratio and aid in maintaining the correct chemical composition in the slag.

By way of further explanation it may be pointed out that in the processing of stainless steel such as the so-called familiar 18–8 stainless steel, a large amount of grinding with abrasive wheels must be performed. This results in great quantities of finely divided metal particles being produced, some of which may be partly oxidized, mixed with bits of abrasive and bonding substance from the abrasive wheel. Based on the weight of its metal values, such detritus should be substantial, but the material is nevertheless usually discarded as a waste product, or recharged into a blast furnace wherein the chrome values are substantially lost. Attempts have been made to clean it and introduce it into an electric melting furnace in which a charge of stainless steel is being prepared, but most of it fails to sink through the overlying layer of slag, or if the slag is swept aside to expose the metal surface, much of the material fails to sink into the molten metal before the slag again closes over the surface and it is picked up by the slag. If it is introduced with the initial charge of the furnace, much of the chrome will be oxidized before the fine material is melted.

General experience with this material has indicated that only about 20% of possible recovery is obtained, and this is under conditions which slow down the production of the electric furnace and increase the current consumption, whereby the expense involved in obtaining recovery is about equal to or greater than the value of the product recovered.

The object of the present invention is to provide a heavy slag forming material and at the same time also provide a cheap, economical and efficient way of recovering these and similar metal values, and to provide a method through which they can be commercially handled for the recovery of the metal.

According to my invention the metal particles which may or may not have been processed to remove most of the abrasive material is mixed with an inorganic bond which is capable of enabling the mix to be molded into bricks or briquettes, and which is preferably of a somewhat refractory nature. According to the preferred practice of my invention, a moldable mix of a relatively dry inorganic bonding material and stainless steel grindings, after being thoroughly mixed, are molded into bricks or briquettes of a size which can be conveniently handled, and of a strength which prevents breakage under the normal conditions of handling to which a material of this kind is necessarily subjected. Ordinary cement, or cement and lime, is preferred as a bonding material. Lime is desirably used where the furnace has a basic lining, particularly if the grindings themselves contain abrasive impurities that are acid in character. The molded bricks or bodies are then allowed to set and harden the bond, after which the bricks can be transported and handled as required, and charged into an electric furnace or other furnace.

The dense heavy metalized bricks or bodies so produced have a density greater than the density of the molten slag on top of the metal charge in the furnace, but less than the density of the molten metal in the furnace. Thus when the bricks are charged into a furnace they float in the metal under the slag and are partly immersed in the metal. This has two advantages. First, because the brick floats in the molten metal, the bottom of the brick disintegrates rapidly. As the bottom disintegrates, the mass naturally sinks further into the metal. The metal particles thus remain encased in the bonding material until they are released by the disintegration of the bonding material and when they are thus so released directly into the molten metal it occurs with no exposure to air, and the metal instantly becomes part of the body of molten metal. Thus the particles are prevented from oxidating during the heating-up period, and they are released out of contact with the atmosphere, and they are released below the surface of the overlying mass of slag. Because of this, a high percentage of the metal values are recovered and the bonding material advantageously becomes a part of the slag in the furnace. The metal fragments, a large percentage of which are of the fineness of dust, are in this manner compacted and provided with a vehicle through which they can be introduced into the furnace, and the metal recovered at the same time providing desirable slag additions to the charge.

According to the preferred embodiment of my invention, Portland cement of low alumina content usually with lime is used as a bond. It may be used with the metal grindings replacing entirely the sand in the usual Portland cement mix or by using a mixture of cement, to which may be added lime, furnace slag and finely divided metal fragments. The slag when used as an aggregate is preferably a high melting temperature slag so as to raise the temperature at which the brick melts to a region close to the melting temperature of the metal particles. The cement or cement with lime and slag concrete will fuse at a temperature around 1800° F., so that the metal particles which are enveloped by and embraced in the concrete matrix are protected from exposure to the air until they have almost reached a melting temperature. Because of this factor alone the usual high rate of loss through oxidation of chrome during the heating-up period is avoided. The metal is not exposed to the air during the heating-up period and, as pointed out above, the disintegration takes place most rapidly at the lower surface of the brick or body below the surface and hence upon release of the metal it is still not exposed to the air.

Portland cement is very desirable material because of its high lime content, and hence the cement which fluxes away as the brick disintegrates is entirely compatible with and becomes part of the slag of the furnace. As a matter of fact a cement clinker is sometimes tossed into a furnace merely to produce slag. Because the cement is entirely inorganic, no problem of introducing carbon into the steel is involved. Moreover, the cement-slag concrete is essentially basic, especially when lime is added, and at the temperature of disintegration of the metalized brick the cement and slag will react with silicon compounds in any abrasive material in the metal grindings at the instant of release and thus reduce the erosion of the furnace walls by reaction with such silicon compounds.

A typical procedure would involve taking 10 to 20% by volume of low alumina Portland cement and 80 to 90% by volume of the metal fragments. Part of the Portland cement may be replaced with lime, the amount of lime not being critical, except that the hardness will be decreased and the curing time lengthened if too much lime is employed. These would be mixed with water to form a thick concrete-like mass in a conventional cement mixer. The mixture thus formed would be charged into hand molds or the molds of a brick-forming or briquette machine or an extrusion machine and subjected to pressure, getting rid of a large amount of the air and forming a mass having a higher density and apparent specific gravity than that of the molten slag in the furnace, and less than that of the molten metal. While metal fragments and cement alone may be used, I prefer to employ with the cement granulated blast furnace slag, and as indicated, lime may be inducted, the slag constituting perhaps 15% by volume of the finished product, the amount not being critical. The quantities of cement aggregate and metal may vary, but enough cement and aggregate should be used to make a strong, well bonded body. Good practice indicates that as much metal should be carried by each brick as possible to avoid the use of excessive amounts of cement. At the same time sufficient cement should be present, with or without aggregate, to form a brick which will be strong enough so that it can be handled without pulverizing or powdering or chipping by conventional brick tongs or furnace charging equipment.

As above explained, once the bricks are charged into the furnace, they sink by their own gravity through the slag. Oxides which may be incidentally present in the grindings will be reduced in the bath. Under any circumstances the bricks thus formed offer no more trouble to the operation of a melting furnace than does the charging of solid scrap metal or the charging of slag-forming material, and with my invention both are added and in desirable proportions. While the bricks or shapes so formed have a high density, still they are sufficiently porous to allow gases and water vapor to escape to avoid explosion hazard.

While my invention has been particularly described for the recovery of metal values in stainless steel grindings, it is also applicable to the recovery of other metals in a finely divided state where the metal value is of a kind or character such that a high loss may be encountered through any attempt to introduce it into the furnace in a finely divided form, as for example metal values high in manganese may likewise be bonded into slag forming material as herein described, or nickel, or fragments or grindings of alloy tool steels may be made part of a slag forming material, and these alloys may contain tungsten and molybdenum.

Additionally the brick may be made a vehicle for incorporating other materials with the finely divided metal particles into the furnace. For example zirconium oxide may be advantageously used as a slag ingredient in the refining of steel, and the brick of the present invention may contain zirconium oxide in an amount sufficinet to provide an adequate amount of it in the slag of the furnace. This is likewise true of Boron compounds. Also chrome itself may be introduced into the furnace in this way, being mixed with the metal grindings and the cement and forming part of the brick or briquette. Also low grade nickel oxide bearing ores may be introduced into the brick and charged into a bath of (14–18 Cr) rustless iron such as one containing 14–18% chromium, thereby providing a nickel addition for converting the rustless iron (18–8) to stainless steel, such as the so-called 18–8 steel. Likewise, if necessary, vacuum processes may be used to aid in removing air from the mix and increasing the density of the finished brick.

Since it is most important that the bricks or bodies so formed be free of uncombined water, they must be adequately cured before being used. In some cases, in lieu of normal dry curing, I may heat them to a temperature approaching the melting point of the metal for a sustained period of time. I have found that if they are heated in the range of about 2000° F. to 2200° F. for about four hours, the surface will fuse or sinter to produce a block or body of metallic appearance that is very strong and will resist rough handling even though a minimum amount of cement and water be used. Firing the material in this way allows less slag forming ingredient to be used; produces a body which is harder; and the water of crystallization is completely removed, the sintered or slightly fused metal providing the bond. This procedure is especially recommended where the operator must be sure that there is no appreciable water in a free state or combined as water of crystallization. Also, finely divided alloying metals, or compounds thereof, as for example finely divided mesh manganese ore can be mixed with slag forming cement, fired in the manner above outlined, either with or without carbon and in a proper atmosphere to reduce at least in part the ore and make a partially metallic manganese brick that can be used where manganese is required, and in this form the manganese will be protected against reoxidation in the melting down process.

While I have indicated that the slag forming material herein described may be added to the "melt" in the furnace, it may also be used as a part of the original "bottom" charge of the furnace.

I claim:

1. The method of recovering the metal values in the detritus from stainless steel grinding operations which comprises mixing the grindings including metallic particles and grinding wheel waste with about 10 to 20% of low alumina Portland cement and water sufficient to form a moldable mix, shaping the mix into bricks, drying the same, firing the bricks to dehydrate the cement and incipiently fuse the mass, and thereafter adding such bricks to an electric furnace charge of stainless steel.

2. The method defined in claim 1 in which granulated blast furnace slag is added to the mix of detritus and cement, the slag and cement together not exceeding 50% of the total volume of the brick.

3. As a new article of manufacture, a brick comprised of a bonded and fused mass of detritus from the grinding of stainless steel including metallic particles and grinding wheel waste and a ceramic bond.

4. As a new article of manufacture, a brick comprised of detritus resulting from the grinding of stainless steel and a bond of dehydrated Portland cement, the mass being incipiently fused.

5. As a new article of manufacture, a brick comprised of detritus resulting from the grinding of stainless steel and a bond of dehydrated Portland cement, the mass being incipiently fused and containing also a granulated blast furnace slag, the Portland cement constituting between about 10 and 20% of the mix and the detritus constituting at least 50% of the mix.

References Cited in the file of this patent

UNITED STATES PATENTS

| | | |
|---|---|---|
| 1,075,135 | Alton | Oct. 7, 1913 |
| 1,119,643 | Saklatwalla | Dec. 1, 1914 |
| 1,551,554 | Greiner | Sept. 1, 1927 |
| 2,082,359 | Schumacher | June 1, 1937 |